UNITED STATES PATENT OFFICE

JOHANNES BRODE AND GEORG KÄB, OF LUDWIGSHAFEN-ON-THE RHINE, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

PROCESS OF DECOMPOSING TITANIUM ORES

No Drawing. Application filed March 10, 1927, Serial No. 174,409, and in Germany March 11, 1926.

The present invention relates to the decomposition of titanium ores.

The iron present in titanium ores can be eliminated by extraction with dilute sulfuric acid, but this reaction however, proceeds extremely slowly. Even at temperatures above the ordinary boiling point of the sulfuric acid, that means when working under pressure, the attack progresses so slowly that it is impossible in practice to extract by this means the iron from the titanium ore to any extensive degree.

We have now ascertained that the ore is attacked far more rapidly if reducing substances be added to the sulfuric acid. The addition of a titanium compound, for example titanous sulfate, has been found particularly advantageous. The operation is preferably carried on at an elevated temperature, an amount of the reducing agent corresponding to that of the ferric compound present in the ore being used. The concentration of the sulfuric acid may vary within wide limits, for example, between 5 and 40 per cent or more without having any appreciable effect on the result.

As difficulties are usually encountered when effecting the purification of the titanium ore to such an extent that practically the whole of the iron is extracted and a titanium dioxid suitable for direct use as a pigment is obtained, it is necessary to decompose the titanium dioxid, low in iron, obtained in the above matter, with concentrated sulphuric acid and to recover pure titanium dioxid from the resulting ferruginous titanium sulfate solution by hydrolysis. The hydrolysis is preferably effected in such a way as to obtain a not unduly dilute sulfuric acid, for example of 40 per cent strength, which can then be used for extracting the iron from a fresh batch of ore.

If the purification of the titanium ore be carried out with an addition of a titanous compound, this may be prepared separately, as for example, by the cathodic reduction of a solution of a titanic salt, and then added to the sulfuric acid. It is, however, more advantageous to reduce a portion of the titanium ore, for example by heating with coal or reducing gases, and to add this to sulfuric acid containing a titanic salt. Under these conditions, the solution containing the titanous salt required for purifying ferruginous titanium ores is produced spontaneously, accompanied by the extraction of the reduced iron from the reduced ore.

The process herein described has the advantage that only a comparatively small amount of sulfuric acid is consumed, and that the treatment of the resulting titanium ore low in iron furnishes solutions of titanium sulfate which are comparatively low in iron and easily yield, on hydrolysis, a titanium dioxid which is practically free from iron.

The following examples will further illustrate how the said invention may be carried into practical effect, but the invention is not limited to the examples.

Example 1

By employing as a reducing agent the quantity of titanous salt needed to transform into the ferrous state the trivalent iron present in the titanium ore, and by working with a sulfuric acid of 20 per cent strength in an agitator autoclave at 180° C., the iron content of a finely pulverized ilmenite, containing about 42 per cent of $TiO_2$, is brought down, within 5 hours, from 40 per cent to not more than 3–4 per cent of iron in the least favorable event; whereas in a corresponding working operation without a reducing agent, the iron content does not fall below about 18 per cent. An Indian ilmenite rich in ferric compounds does not behave differently from a Norwegian ilmenite rich in compounds of bivalent iron.

Example 2

Finely powdered ilmenite, containing about 55 per cent if titanium dioxid and 33 per cent of iron is shaken up for 6 hours at 180° C. with a sulfuric acid of 40 per cent strength and as much metallic copper as is needed for the reduction of the amount of trivalent iron present, in accordance with the equation $2Fe^{+++} + Cu = 2Fe^{++} + Cu^{++}$. After being separated from the gangue by elutriation, a titanium dioxid is obtained which contains only about 0.5 per cent of iron.

Example 3

Finely powdered ilmenite is shaken up at from 170–180° C. with 40 per cent sulfuric acid and gaseous sulfur dioxide under a pressure slightly higher than the vapor tension of the sulfuric acid. Within 6 hours the iron content falls from 33 per cent, for example, to 7 to 9 per cent of iron.

Example 4

By proceeding as in Example 3, and adding to the reaction mixture a small amount of a catalyst, which accelerates the reaction $2Fe^{+++} + SO_2 + 2H_2O = 2Fe^{++} + SO_4^{--} + 4H^+$, for example an amount of animal charcoal, equivalent to 1 per cent of the ilmenite, or 1.5 to 3 per cent of pulverized copper, or copper in the form of a salt, for example 0.2 per cent of cupric iodide, the iron content of the ilmenite can be reduced to about 1 per cent of iron within 6 hours.

What we claim is:

1. The process of decomposing raw titanium ores and removing the iron therefrom which comprises directly treating the raw ore with dilute sulphuric acid in the presence of a reducing substance for the ferric ions.

2. The process of decomposing raw titanium ores and removing the iron therefrom which comprises directly treating the raw ore with dilute sulphuric acid in the presence of a titanous compound as a reducing substance for the ferric ions.

3. The process of decomposing raw titanium ores and removing the iron therefrom which comprises directly treating the raw ore at an elevated temperature with dilute sulphuric acid in the presence of a reducing substance for the ferric ions.

4. The process of decomposing raw titanium ores and removing the iron therefrom which comprises directly treating the raw ore with dilute sulphuric acid containing a titanic compound in the presence of a reducing substance for the ferric ions.

5. The process of decomposing raw titanium ores and removing the iron therefrom which comprises directly treating the raw ore with dilute sulphuric acid in the presence of a reducing substance for the ferric ions, dissolving the purified ore in concentrated sulphuric acid, decomposing the titanium sulphate solution by hydrolysis, separating the liquid from the titanium dioxide, and using the liquid over again for the decomposition of a fresh batch of the ore in the presence of a reducing agent for the ferric ions.

6. The process of decomposing raw titanium ores and removing the iron therefrom which comprises directly treating the raw ore with dilute sulphuric acid in the presence of metallic copper as a reducing substance for the ferric ions.

7. The process of decomposing raw titanium ores and removing the iron therefrom which comprises directly treating the raw ore with dilute sulphuric acid in the presence of sulphur dioxide as a reducing substance for the ferric ions.

8. The process of decomposing raw titanium ores and removing the iron therefrom which comprises directly treating the raw ore with dilute sulphuric acid containing a titanic compound in the presence of reduced titanium ore as a reducing substance for the ferric ions.

9. The process of decomposing ilmenite and removing the iron therefrom which comprises directly treating the raw ore at a temperature of about 180° C. with dilute sulphuric acid in the presence of a titanous salt sufficient to reduce the ferric ions.

In testimony whereof we have hereunto set our hands.

JOHANNES BRODE.
GEORG KÄB.